July 20, 1937.　　　W. G. PANKONIN　　　2,087,779
STAPLING DEVICE
Filed June 21, 1934　　　4 Sheets-Sheet 1
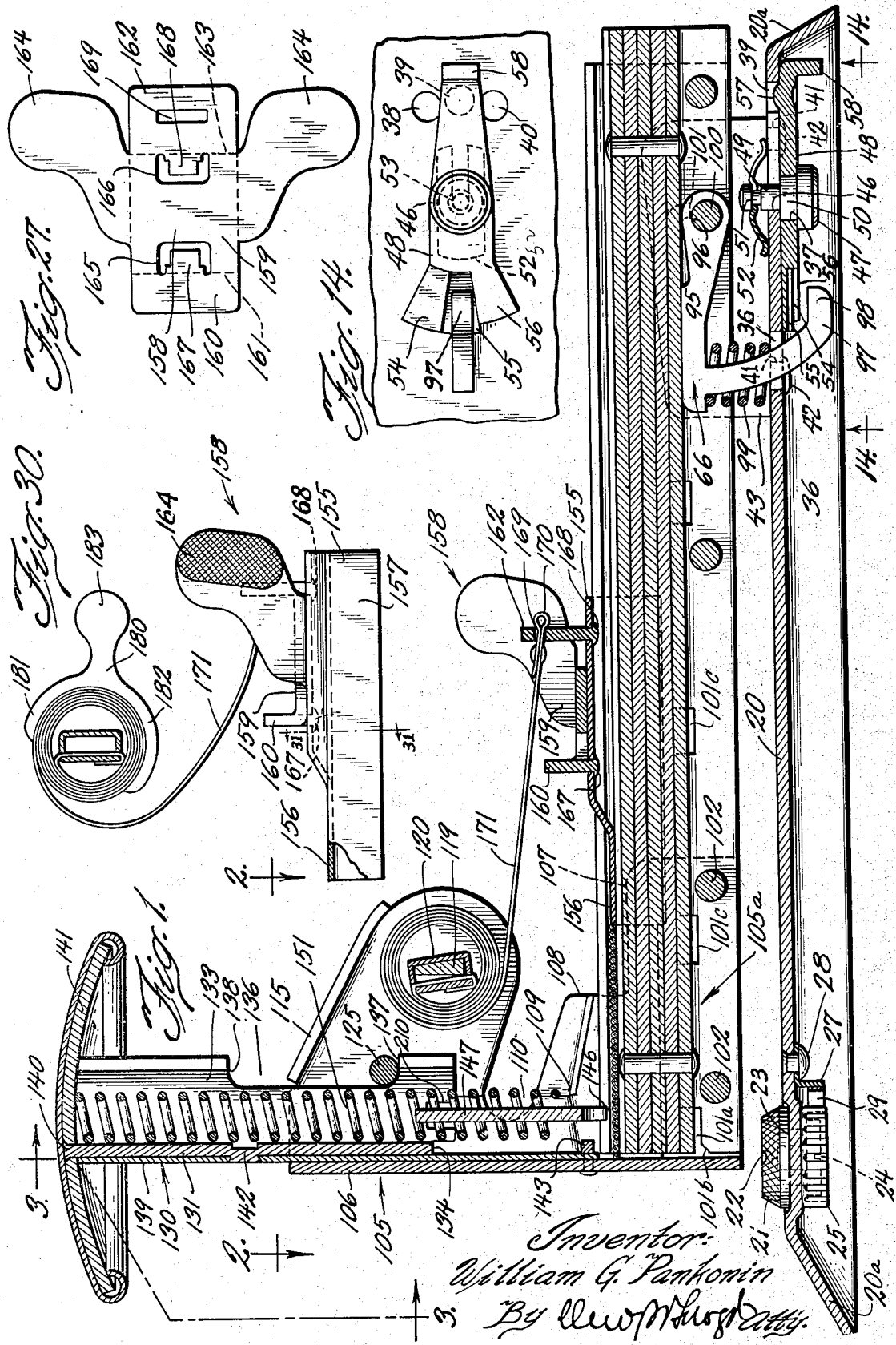

July 20, 1937. W. G. PANKONIN 2,087,779
STAPLING DEVICE
Filed June 21, 1934 4 Sheets-Sheet 2
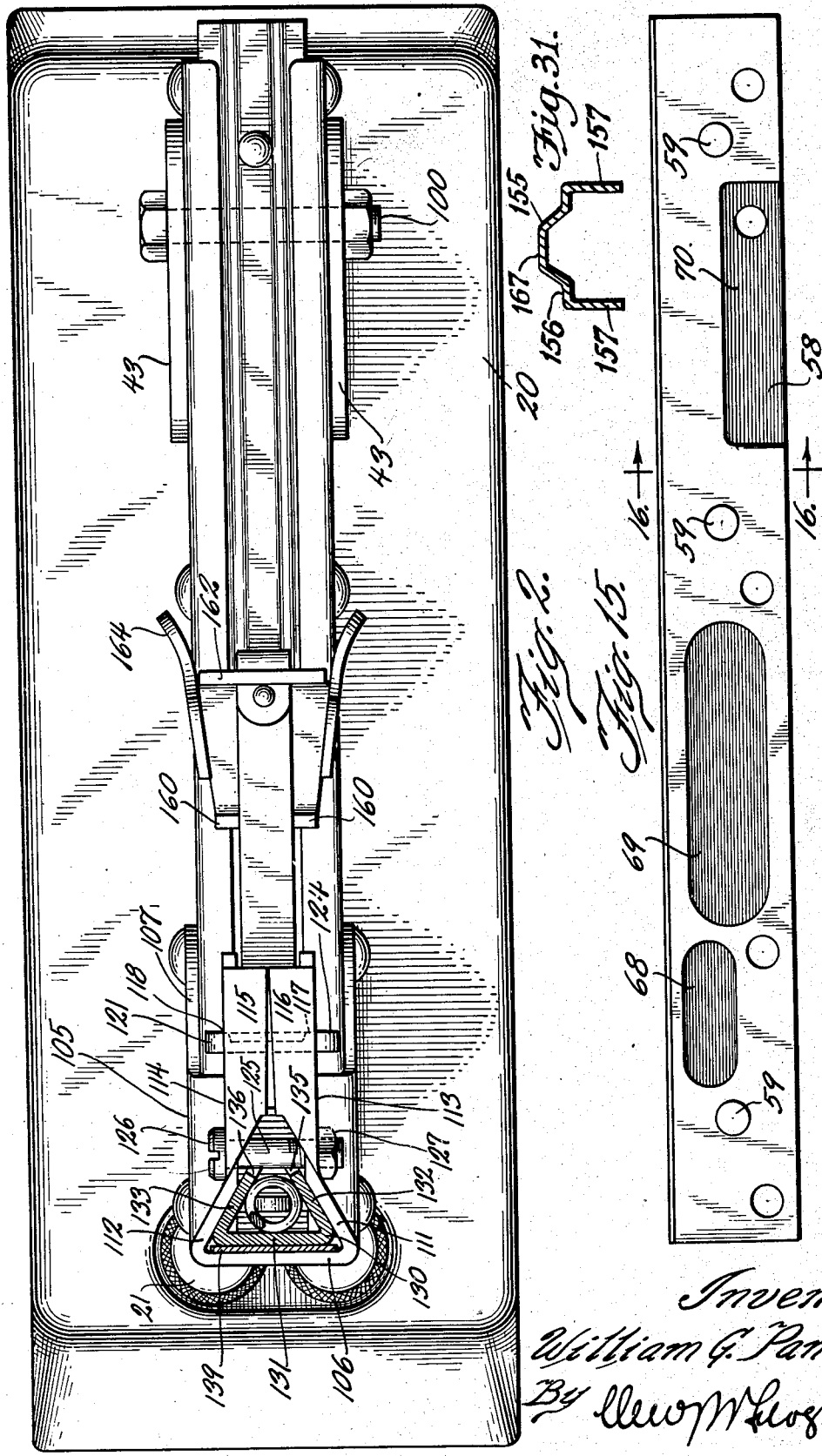
Inventor:
William G. Pankonin July 20, 1937.   W. G. PANKONIN   2,087,779
STAPLING DEVICE
Filed June 21, 1934   4 Sheets-Sheet 3
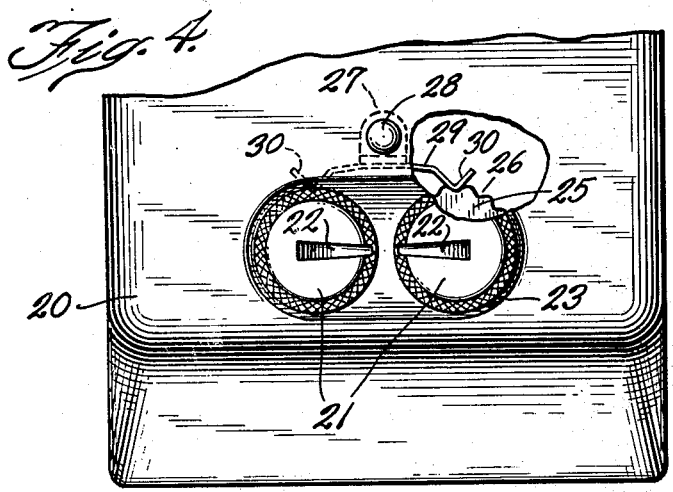
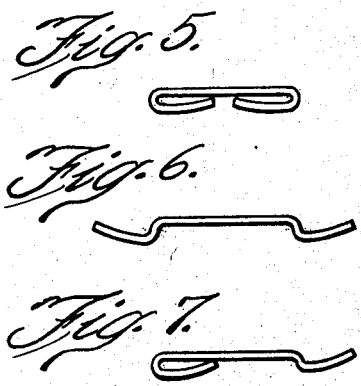
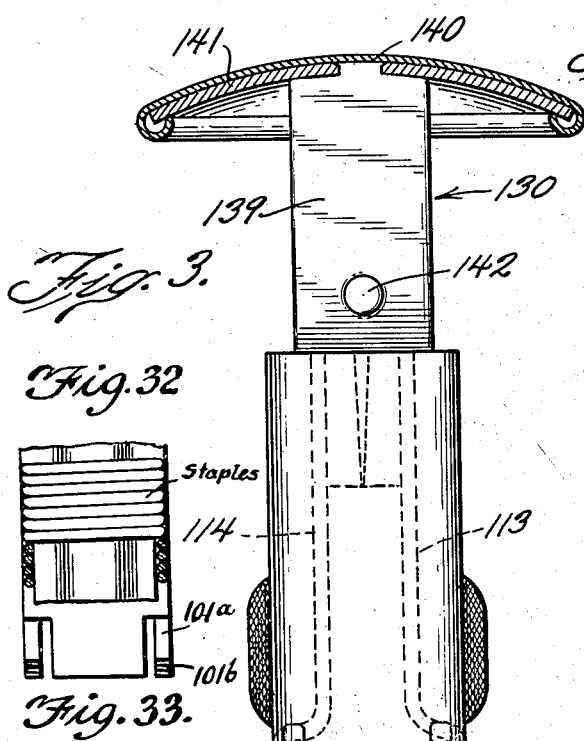
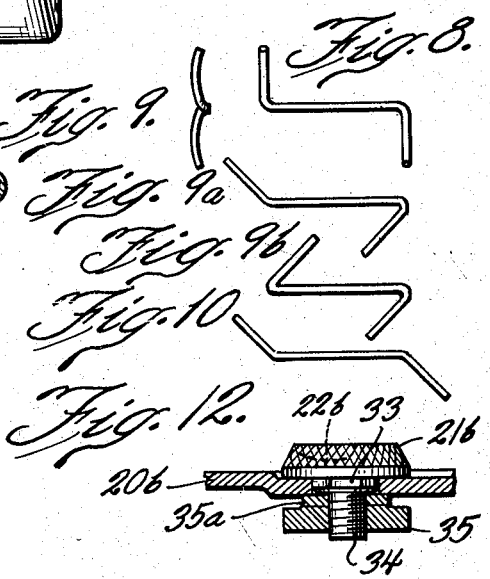
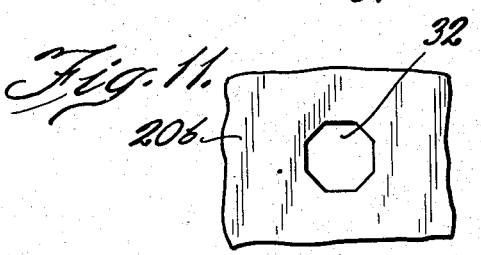
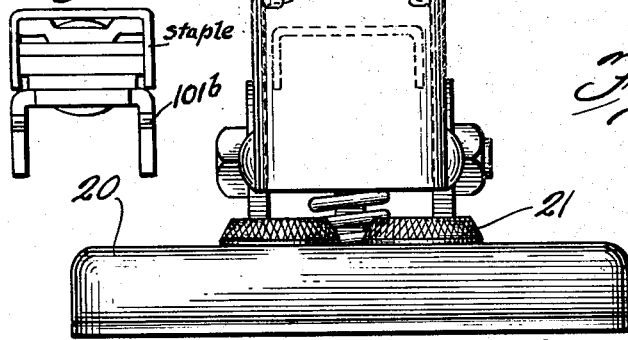
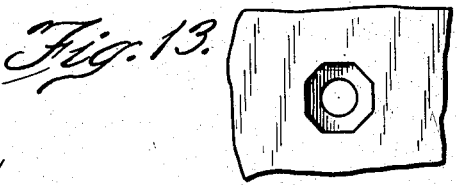
Inventor:
William G. Pankonin July 20, 1937.  W. G. PANKONIN  2,087,779
STAPLING DEVICE
Filed June 21, 1934  4 Sheets-Sheet 4
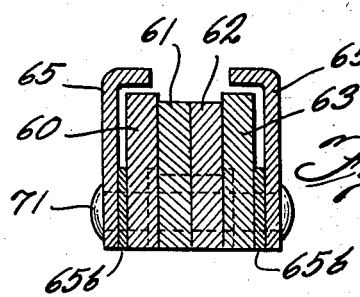
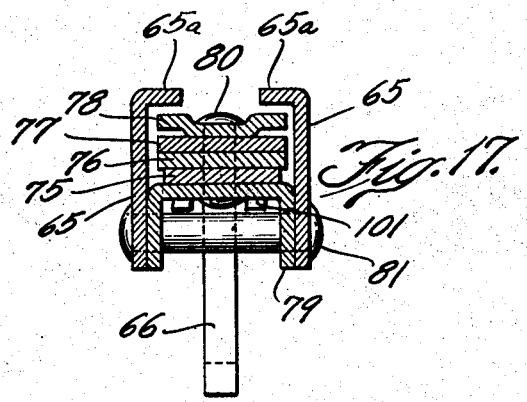
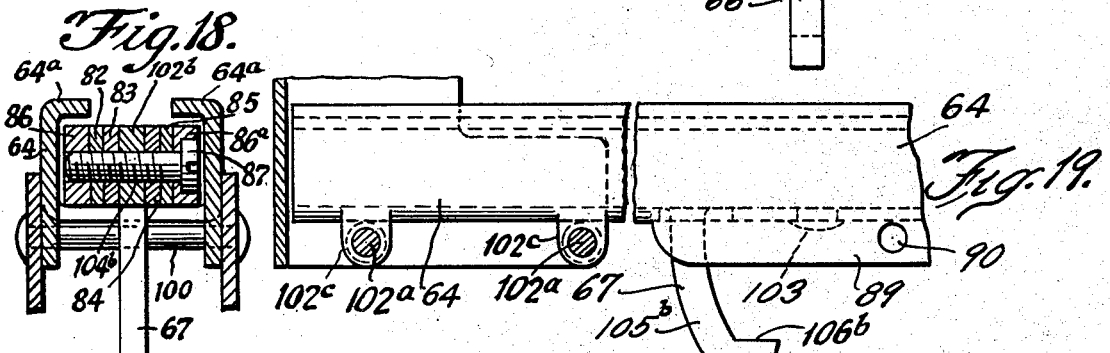
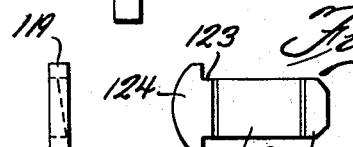
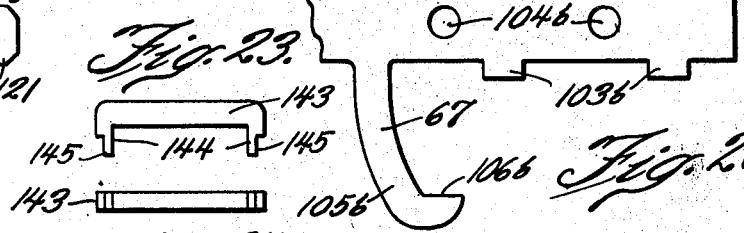
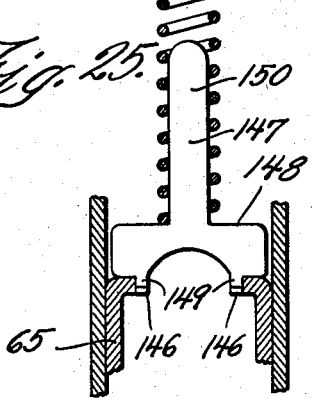
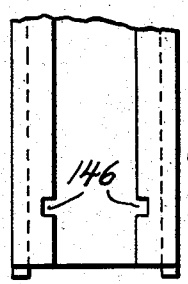
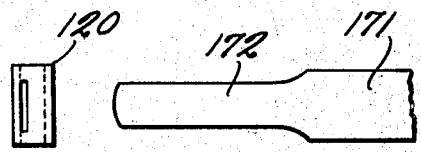
Inventor:
William G. Pankonin
By Patented July 20, 1937

2,087,779

UNITED STATES PATENT OFFICE 2,087,779

STAPLING DEVICE

William G. Pankonin, Chicago, Ill.

Application June 21, 1934, Serial No. 731,609

22 Claims. (Cl. 1—3)

The present invention relates to stapling devices in which preformed wire staples adhesively attached to one another are employed.

Among the objects of the present invention are the provision of the following:

A plurality of stapling deforming dies that are relatively movable to one another to provide a number of different deformations for the staple driven thereagainst;

Novel relatively movable independent staple deforming anvil dies and means for locking said dies in a selected position to provide a plurality of predetermined staple deformations;

An unique connecting means between the base and beam of a staple device including novel spring holding means;

A novel means for regulating the angular relation of the movable beam of a stapling device to the base on which it rests, and having separate means adjustable to provide positive limitations of different magnitudes in respect to the movement of the beam;

A novel combination of connecting means and angle regulating means between a stapling machine base and the staple carrying beam thereon;

Novel beam construction to provide a riser for regulating the angular movement of a magazine beam;

An improved housing of novel shape and construction for enclosing a staple driving plunger and staple magazine end;

An adjustable housing body with means for tightening it about a staple driving plunger;

A stapling housing regulating member having adjustable means which also serves as a stop for the staple driving plunger;

An unique arrangement of the staple driving housing to provide a stop for the staple driving plunger and for the magazine follower;

An unique arrangement of wings on a staple driver housing for receiving a magazine spring;

Novel anchoring means for a magazine spring comprising a core about which the spring is wound, a key providing a transverse support therefor, and interrelationed parts which maintain the spring core in position so long as the spring is operable;

An unique spring core and key providing ready detachment of the spring when broken, and firm attachment so long as the spring is active;

An unique readily replaceable follower and spring which may be inserted into position without the use of tools and which may be positioned by any user;

A novel follower for staples consisting of a staple following member and the handle, the latter providing a stop for the staple engaging means and a spring anchor;

An unique staple driving plunger to which the staple driving tool is attached, the plunger being positioned and maintained in the housing by providing cutout sections which engage a stop member in said housing;

An improved means for attaching a staple driving plunger to a staple driving member;

An unique means for guiding the staple driving tool in a selected path in the housing;

Novel means for guiding a spring in a hollow staple driving member;

Unique means for securing a staple driver spring guide to a beam magazine; and

A novel means for packing a staple follower spring usable in positioning said spring in the machine to replace a broken or defective part.

These objects and such other objects as may hereinafter appear are obtained by the novel construction, improved arrangement, and unique combination of the parts shown in the embodiments of the invention illustrated in the accompanying sheets of drawing hereby made a part of this specification and in which:

Figure 1 is a longitudinal section through a machine illustrating one form of the invention;

Figure 2 is a horizontal section of the device shown in Figure 1 on the line 2—2 of Figure 1;

Figure 3 is a vertical section on the line 3—3 of Figure 1;

Figure 4 is a detail in plan view of the anvil dies shown in Figure 1;

Figures 5, 6, and 7 illustrate, in side view, staples deformed in said anvils when in different positions;

Figures 8 and 9 illustrate top and end views of a deformed staple obtained by another position of the anvil dies;

Figures 9a and 9b represent top views of two other staples with deformations possible with the present stapling device;

Figure 10 is a plan view of a staple obtainable by another setting of the dies;

Figure 11 is a fragmentary detail, in plan, of a modified anvil seat;

Figure 12 is a transverse sectional detail of a modified attaching means for use in the seat shown in Figure 11;

Figure 13 is a detail similar to Figure 12 but with the seat partly circular and partly octagonal;

Figure 14 is a bottom plan view showing a detail from the line 14—14 of Figure 1;

Figure 15 is a side elevation of one form of core which may be employed as a part of the magazine beam in the present device;

Figure 16 is a transverse section of the beam shown in Figure 15 and taken on the lines 16—16 of said Figure 15;

Figure 17 is a similar view of a different core showing the loosely disposed riser illustrated in Figure 1 in transverse section;

Figure 18 is a similar view of another form of beam having a riser in rigid connection therewith;

Figure 19 is a fragmentary side elevation of the beam shown in Figure 18;

Figure 20 is a fragmentary detail in side elevation of a part of the riser;

Figure 21 is a side elevation of the key for holding the core of the staple follower spring in the housing;

Figure 22 is an end elevation of the key shown in Figure 21;

Figure 23 is a plan view of the guide in the housing for the staple driving blade;

Figure 24 is a side elevation of such staple driving blade guide;

Figure 25 is a fragmentary transverse section of the device illustrated in Figure 1, such view illustrating the spring for the staple driving member, the guide therefor, and the manner of connecting the latter to the beam magazine;

Figure 26 is a horizontal transverse detail of the top of the magazine beam showing the notches therein to receive the staple driver spring guide;

Figure 27 is a plan view of the blank for forming the finger pieces, stop and spring anchor on the magazine follower;

Figure 28 is a detail in plan view of the inner end of the magazine follower spring;

Figure 29 is a plan view of the core for coiling the magazine spring;

Figure 30 is a detail, in side elevation of a coiled magazine follower spring, the core therefor, and the yoke thereabout the follower attached to said spring being in fragmentary longitudinal section;

Figure 31 is a transverse section on the line 31—31 of Figure 30;

Figure 32 is a fragmentary transverse view, with parts broken away, of the front end of the magazine showing the staple cutting up structure; and Figure 33 is an end view of the magazine shown in Figure 32.

Like reference characters are used to indicate similar parts in the drawings and in the description which follows.

The illustrated machine and modifications comprise a base, a beam magazine, connecting means therebetween, a housing at the free end of the beam, a staple driver in the housing, and a staple follower riding in the magazine and actuated therealong by spring means. In respect to each of the several members named, parts of the structure are novel and new.

For convenience in describing the illustrated embodiments of the invention, this specification has been divided, as far as practicable, to separately describe as units the various parts named. The co-relation of such parts will be set up as the description proceeds.

*The base*

A base 20 of an inverted dish type is provided. It has a substantially continuous supporting edge or flange 20a. A number of apertures are formed therein for mounting anvil dies, magazine guide plates and an angle regulating member, and for the movement of a riser therethrough.

At the front of the base 20 are two rotatable anvil dies 21, the axis of rotation of each die being concentric with the axis of the leg of a staple which is discharged thereagainst for deformation. These anvils are further defined and claimed in the copending application Serial No. 103,981, filed by the applicant herein on October 5, 1936. Each die 21 has a radially disposed clinching seat 22, a clip section of which is axial of the staple leg to be deformed thereby. The seat 22 is slightly longer than the radius of the die 21.

Each rotatable anvil die 21 may be adjusted to a plurality of positions. For example, the elongated radial seats 22 in the two dies may be arranged in alinement. Either seat may be rotated relatively to the other so that the two seats may be positioned in a plurality of angles. Both seats 22 may be shifted with equal facility. The positions obtained by such adjustments provide a variety of staple deformations such as are illustrated in the drawings.

If the seats 22 are in alinement and pointed inwardly, the staple is deformed by turning both legs under the bridge (Figure 5); if one seat 22 points to the front and the other seat 22 points to the rear of the machine, the result will be a Z-shaped staple such as is shown in Figures 8 and 9; if the seats are in alinement but pointed outwardly the result will be an elongated member which may be readily withdrawn from the stapled papers in either direction as is illustrated in Figure 6; if one seat 22 is pointed inwardly and the other outwardly while the two are in alinement, then a hook ended staple such as is shown in Figure 7 is obtained; two other deformations intermediate the form shown in Figures 8 and 10 are shown in Figures 9a and 9b; and when both seats are pointed outwardly and in parallelism but not in alinement, the result will be a readily removable staple of sinuous configuration such as is shown in Figure 10. Other results may be obtained by adjustments different from those hereinabove suggested.

The staple driving arm may be detached from the base so that it may be employed as a tacker for attaching shipping tags to boxes and the like.

Several manners of mounting the anvil dies 21 on the base 20 are shown. In one of these, Figures 1, 3 and 4, the dies 21 rotate in seats 23 in which they are pivoted. Each anvil 22 is keyed to a flanged sleeve 25 having a notched periphery 26. A screw 24 extends through the sleeve 25 into the bottom of the anvil 22 and provides a necessary connection between these parts to lock the anvil at the top and the sleeve 25 at the bottom of the base in a readily rotatable manner. The screw 24 is forced home only so far as is necessary to maintain the parts in assembly without undue frictional binding of the anvil and sleeve upon the base 20.

To the rear of each notched sleeve 25 and between said two sleeves, as is illustrated in Figures 1 and 4, there is an L-shaped anchor 27 which is pivoted to the under side of the base 20 by a rivet 28 or the like. Secured to the anchor 27 and extending to each side of the longitudinal center line of the base 22 is a spring 29 which has two V-shaped ends 30, each end 30 engaging in a notch 26 in sleeve 25 to hold the sleeve 25 and the anvil 21 keyed thereto against accidental rotation.

When desired, the relative positions of the two anvils 21, or either of them, may be modified first by gripping the anvils 21 at their edges which are knurled for this purpose or by gripping the sleeves and then rotating such part or parts.

A second method of attaching an anvil die and a different attaching means are shown in Figures 11 and 12. In the base 20b shown, there is an octagonal aperture 32. Depending from the anvil 21b is an octagonal shank 33 formed as an integral part of the base of the anvil die or suitably attached thereto. The shank 32 terminates in a threaded section 34. The aperture 32 in the base 20b to receive the octagonal shank 33 and threaded portion 34 may be wholly octagonal as shown in Figure 11 or it may be modified to have a circular section for the threaded member and an octagonal seat for the octagonal member. (See Figure 13.)

At the end of the threaded section 34 there is a wing nut 35 and intermediate the engaging face of the wing nut 35 and the base 20b, there may be a washer 35a of suitable character. The anvil 21b is disposed in the octagonal aperture 32 with the staple deforming seat 22b in the anvil 21b in a selected position. Tightening of the wing nut 35 on the threaded section 34 firmly seats the anvil 21b against rotation or displacement until a change in adjustment is desired.

At the other or rear end of the base 20 is a suitable aperture 36 for a riser engaging an angle regulating lever in the underside of the base 20. Such angle regulating lever is to provide a selected normal position for the magazine beam when at rest. A centrally disposed aperture 37 is also shown in base 20 for a pivoting anchor bolt 46 upon which is a lever 48 for modifying the angle of the rest position of the beam. A plurality of ball seats 38, 39 and 40 for the pressed out portion 57 of the lever 48 are formed in the bottom of the base. A number of slots 41 (see Figure 1) are formed in the base to receive tongues 42 in side plate members 43 between which a magazine beam is oscillated in the discharge of a staple from the device and in the return of the beam to a position of rest.

It will be noted that the side members 43 are parallel and that each is firmly anchored in the base 20 by riveting the tongues 42 projecting through the slots in the apertures 41. Through the base 20, there extends, in the aperture 37 the anchor bolt 46 which has a head 47 of which is disposed beneath the lever 48. Between the head 47 and the shank 49 of bolt 46 is an enlarged portion 50 about which the lever 48 slidingly rotates.

In the shank 49 is a circumferential groove for the reception of a U-shaped spring 52 the legs of which are seated in the groove 51 and are locked in position therein by complemental notches 53, one of which is in each of such legs.

The aperture 36 in the base 20 is for the depending riser (66 or 67) in the magazine beam, and is of a size and shape insuring that the material of the base will not interfere with the free movement of the riser therethrough as the magazine beam is lowered and raised.

On the under side of the base 20 and pivoted on bolt 46 is the lever 48 which is oscillated about such pivot bolt 46 in horizontal parallelism with the base 20. Such lever 48 is movable from longitudinal alinement clockwise from such alinement with said base to a similar angular but opposed position.

At the front of the lever 48 are three steps 54, 55 and 56, each in a different horizontal plane relative to the plane of the top of the base 20. At the other end of the lever 48 is a pressed-out semi-spherical section 57 resembling a segment of the periphery of a ball. At the extreme rear end of lever 48 is a bent over section which forms a handle 58 for the manipulation of the lever 48 from any one of its several positions to another thereof.

In the base 20, one of the three ball seats 38, 39 and 40, receives the pressed-out section 57 of the lever 48 to firmly but displaceably position said lever so secured by registration of section 57 with one of said seats, the lever 48 presents one of the steps 54, 55, or 56, to the riser (66 or 67) to limit upward movement of the magazine beam under the urge of a spring resting on said base and later to be described, when registered in the second of such positions the lever presents another of said steps to the riser to allow urge of the beam to a different angular position, and when the riser is registered with the third of said seats, the third step registers with the riser to limit movement of the beam under such spring urge to a third angular position.

The machine screw or bolt 46 on which the lever 48 is pivoted is so held in the base by spring 52 that slight relative movement of the lever 48 away from the plane of the base 20 may be had to admit of the shifting of the lever 48 to the three positions described by pressing upon the handle 58.

In the present device, any suitable beam magazine may be used. It has been conventional heretofore to employ both solid cores and hollow cores for such beams, the latter being made from a piece of channel iron or steel in complemental relation to the outer member of the beam. In the present device either of these constructions may be used. In addition, the apparatus lends itself to use with a laminated core described in a co-pending application Serial No. 741,658 for Letters Patent filed August 27, 1934 in the name of William F. Weber and entitled Stapling machine core.

*The beam*

When a solid core is used, it may be cut away as shown in Figure 15 to provide large holes or slots 68 and 69 therein to lighten the weight of the core. When such core comprises laminations of metal such apertures are provided for a similar purpose.

The magazine beam comprises, in addition to the core, either a channel member 64 or side members 65. When a channel member 64 is employed it has inturned top flanges which are spaced apart at least the major length of the beam to admit of the passage of a staple follower along the magazine. Such flanges are designated 64a in Figure 18. Similar flanges on L-shaped side members 65 are designated 65a in Figure 17.

As illustrated, the beam shown in Figures 15 and 16 comprises side members 65, vertical core laminations 60, 61, 62 and 63, and spacers 65b between the laminated core and the side members 65, the whole being held in assembly by dowels 59 and rivets 71. A space 58 for the riser 66 is shown in Figure 15.

Such riser comprises a flat body 95 having an apertured end 96 for movement about a pivot, and a stirrup 97 which rides freely in the aperture 36. At the end of the stirrup 97 is a hook 98 which engages one of the steps 54, 55 or 56 to limit upward movement of the riser under the influence of coil spring 99 surrounding the stirrup 97 and resting upon the base 20 adjacent and about aperture 36 therein, the opposite end of the base engaging the under side of the body of the riser to urge it upwardly about its pivoted end 96. The side plates 43 have extending therethrough a bolt or rivet 100 on which both the magazine beam and riser rock. In the form of invention described, the riser and beam are relatively movable so that the beam rises with the riser under the urge of spring 99 to a position of rest from which it may be angularly moved upwardly if and when desired without disturbing the position of the riser.

In Figure 17, the riser 66 is illustrated with a different form of core comprising an inverted channel member 79, laminations 75, 76, 77 and 78, and side members 65 joined by rivets 80 and 81, the beam being mounted on the base 20 in a manner identical with that of the previously described beam. In the channel member 79 are ears 101 (Figures 1 and 17) comprising tangs that are struck down from the material of the lowermost strip of the core. The ears or tangs 101 are closely adjacent each side of the riser 66 and limit movement of the riser 66 axially of the pivot member 100. The ears or tangs 101 thus prevent movement of the riser 66 toward one side of the longitudinal center line of the beam and base. In such form of riser a cut-out like 70 shown in Figure 15 is necessary.

In the beam structure shown in Figures 18, 19 and 20, the riser 67 is held rigidly in the core. In such form of beam, the beam includes the channel 64 with inturned flanges 64a, vertical laminations 82, 83, 84 and 85, vertical side pieces 86 and 86a, and screws 87. In a slot therefor is a riser 67 comprising a body 102b, tangs 103b to be riveted in complemental slots in the channel 64, apertures 104b for screws 87, a stirrup 105b, and a boot 106b. The boot 106b kicks against one of steps 54, 55 or 56 to positively limit upward movement of the beam. The channel has wings 89 apertured at 90 to receive the shank of pivoting member 100 inserted through and locked in side plate 43.

The inturned flanges on the side members 65 and the channel 64 allow staples to ride on the beam without displacement and free from undue friction. The spacing of the inner edges of flanges 64a and 65a permits of free riding of the staple follower upon any of the beams described. At the front of the beam the channel member 64 or the side members 65 terminate at their tops in end parallelism with the core to provide a staple path between the front wall of a housing to be secured thereto and the front end of the magazine beam anchored therein, there being side extensions of said members forming the side walls of the chute defining the end walls of such staple path as shown in Figure 26.

Dowels 102a or other fastening means are arranged at spaced intervals along the beam at its front end, whether comprising a channel member or two L-shaped members, to hold in position at such front of the device a housing for the staple driver and other parts. Such dowel pins 102a, of course, are below the path of travel of the staples along the magazine beam and are inserted through apertures in ears 102c extending or turned downwardly from the material of the L-shaped members or from the channel member to receive such dowels.

The housing for the staple driving head

At the free end of the beam is a housing 105. The housing 105 may comprise a single sheet of material suitably cut to blank form and folded to provide adjacent the top thereof and at its rear a housing for a spring staple follower. At its front the housing surrounds a staple driving tool.

Housing 105 comprises a front 106 extending in a single flat plane from the top of the housing to the lower horizontal plane of the beam 105a. The lower section of the housing 105 extends rearwardly lengthwise of the beam 105a and at each side thereof and is secured thereto by dowel pins 102 extending through the skirts of the housing and through the beam as heretofore described. Side skirts of the housing 105 comprise sections of two heights, the rear section 107 having a top edge below the top of the beam 105a. The remaining section 108 of the skirt may be of shorter longitudinal extent. At its upper part sections 108 are bent inwardly to provide a stop for a staple follower used on the beam magazine 105a. Such sections 108 when folded in partly cover the beam magazine. The material of the skirts 108 is so shaped that it forms a shouldered section 109 out of the path of the staple driver. The material of skirt 108 may be shaped to provide a guide for the staple driver 130 at the end of its down stroke.

Above the shouldered section 109 (Figure 1), there is a slot 110. Also above said shouldered section 109 are two oblique walls 111 and 112 (Figure 2) which with wall 106 define the path of and guide the staple driving plunger. Said walls 111 and 112 are bent inwardly to provide for the upper section of the housing a triangular horizontal section. The triangular section of the housing extends upwardly to the top thereof, terminating in a plane transverse to the movement of the staple driving plunger therein.

Projecting from the inwardly turned sections 111 and 112 of the triangular housing, there are parallel wings 113 and 114. These extend rearwardly of the housing a distance substantially equal to the rearward extension of sections 107. The wings 113 and 114 as they project backwardly slope downwardly at their top edges and together they form the spring housing. The space between the rearwardly extending wings 113 and 114 may be covered as by the turning inwardly of extensions 115 and 116 at the top edge of the wings as shown. The extensions 115 and 116 are so formed that space is left for the free passage of the staple driver in its movement up and down in the housing. As shown the edges of the extensions 115 and 116 may converge toward the rear to leave room at the front for a housing adjustment later to be described.

Intermediate the wings 113 and 114 adjacent the intersection of the said wings with the oblique sections 111 and 112 of the housing is an adjusting screw 125 with a head 126 and a nut 127, the purpose of which is to draw the wings 113 and 114 together and to thus tighten the sections 111 and 112 of the housing about the staple driving plunger therein to take up wear on the staple driving plunger or to stiffen the movement of the staple driving plunger therein.

The body of the screw 125 provides a stop for limiting the upward movement of the staple driving plunger and may also limit its downward movement but it is preferable to have the end of the plunger 130 stop against the inturned flanges 64a or 65a of the side plates. The staple driving device is provided by the housing structure described with bearing surfaces in the top portion of the housing by the parts 106, 111 and 112 and may be supplied with further bearing parts at the bottom of the housing by the skirts 108 of the housing. There is no definite need for the lower skirt to serve as a guide for the staple driving plunger because of the sufficient bearing surface obtained by the use of members 106, 111 and 112 but, as indicated, may be so formed as to provide a lower guide for such staple driving head.

The staple driver

The staple driver or plunger 130 heretofore mentioned comprises a body with three sides, the front (131) and two obliquely disposed sections (132 and 133) dependent from the front 131 and bent to converge at the rear of the driver. The body of the driver 130 has removed therefrom at 134 a small transverse section at the front 131 thereof and extending into the sides 132 and 133. The removal of material just described is to make room for a staple driving blade guide 143 within the housing and later to be mentioned. The driving plunger (Figure 2) has cut away sections at 135 and 136 at the rear edges of the sections 133 and 134 to provide transverse shoulders 137 and 138 (Figure 1). On the up stroke of the driver, the material thereof contacts the adjusting screw or bolt 125 at shoulder 137 so that the adjusting screw is made to perform the function of providing a stop for the driver as well as an adjustment member for the housing. On the down pressure of the driver when the housing is spaced from the base 20, the staple carrying arm first contacts the material to be stapled, then the driver descends driving the staple until the end of the driver meets the inturned flanges 64a or 65a.

At the front of the staple driving plunger 130 is a staple driver blade 139, a flat strip of metal which extends substantially the full length of the staple driving member 130 and depends therebelow. At the top of the staple driver plunger 130 are projecting tongues 140 which are riveted to a handle 141. The handle 141 is an inverted dished member with a rolled edge, the rounded dished part receiving the impact of the palm of the hand or of the fist. The end of the staple driving blade 139 may be seated in a pocket in the handle 141 and thus kept in alinement along its upper section. It is securely fastened to the front 131 of the triangular staple driving plunger 130 by a rivet 142 arranged intermediate its length. Said blade is guided in a definite path at its lower end by a staple driver guide 143, a U-shaped member extending across the front of the staple driving housing.

Member 143, Figs. 1, 23 and 24, has two legs 144 which have extensions 145 which project through the front 106 of the housing and are riveted thereto, there being shoulders intermediate the legs 144 and extensions 145 to define the extent to which the guide member 143 may be forced forwardly in the housing. The bridge of the guide member 143 is out of the path of the staple driving plunger 130 because of the cut-away section 134 of the latter at the front and bottom thereof. The blade member 139 cannot rise above the limits of the staple driver guide 143 so that the staple driver blade is always in proper alinement with the front of the housing and staple driving plunger and is always directed in its downward journey into a predetermined path therefor between the end of the magazine beam and the front 106 of the housing, the guide 143 alining the driving tool to enter the staple chute formed by the housing, the inside pads of the magazine side plates, and the end of the staple core. It has already been stated that the magazine beam is firmly secured in the housing with a staple track between the front of the beam and the front 106 of the housing by dowels, screws or other fastening means 102 traversing the beam and housing.

Opposed notches 146 (Figures 1, 25 and 26) are formed in the outer magazine member for the reception of a guide for a spring and to retract the staple driving plunger, whether such member or members comprise the L-shaped members 65 or the channel 64. Said spring guide comprises an inverted T-shaped member 147, the cross arm 148 thereof having tongues 149 therein for interfitting with the opposed notches 146 in the outer magazine member or members. Tongues 149 need not be riveted into position for the tension of the spring thereon insures that the spring guide will be maintained in a fixed position.

Surrounding the stem 150 of the T-shaped guide member 147 is a coil spring 151. The lower extremity of the spring 151 engages the top of the cross arm 148 and the upper extremity of the spring engaging the under side of the handle 141. The spring guide 147 is so positioned that the spring 151 is maintained concentric of the staple driver plunger and clear of the adjustment screw 125 for tightening the housing about the staple driving plunger. The guide 147 cooperates with the staple driving member walls to prevent any buckling of the spring 151 when the latter is compressed on its down stroke. Slots 210 in the lower edges of its sides 132 and 133 provide a means for clearing the lower portion of member 146.

The staple driving blade or tool 139 at its lower end normally is just above the horizontal path of the staples on the staple beam magazine. But little movement of the blade is required to engage the end staple discharged from the magazine into the vertical staple path and to enter the relatively close fitting staple and blade path between the end of the beam magazine, the housing front 106, the inside face of the side plates, and the skirts 109. No large amount of force is necessary to drive the staple substantially the entire length of the path just defined.

When the staple leg ends strike material upon the anvils 21, or the seats 22 in said anvils, greater driving force is required, first to penetrate the material on the anvil, and later to deform the legs of the staple, a progressive operation. At the time such greater force is required, the extending section of blade 139 has progressed well down the staple path leaving a relative short section thereabove.

The staple follower and spring therefor

A member 155 having a generally U-shape in cross section is disposed for movement along the core and under the guiding influence of the outer magazine member of member 65. The front section 156 thereof closely follows the configuration, in cross section, of a staple. Such front end thereof rides along the magazine in contact with the rearmost staple to drive it in the direction of the staple driving tool or blade.

The rear section 157 of the follower 155 is slightly elevated at its center to provide mounting space above the core therebeneath for attaching means which extend therethrough. Said rear elevated section, at each side, is offset from the lower section of the follower which rides in the staple leg path to avoid frictional engagement with the flanges 64a or flanges 65a.

In the top of section 157 are transverse apertures which facilitate mounting of a handle and stop member thereto.

A handle member 158 is disposed on the follower 155. The member 158 comprises a central body portion 159, a front end 160 folded upwardly on the line 161, a rear end 162 folded upwardly in the line 163, and two side members 164 which form finger pieces. Each of the members 160 and 162 is partly separated from the body 159 by a U-shaped slot, 165 and 166 respectively, so that when folded upwardly tongues 167 and 168 depend downward incident to the upward fold of the ends of the member. The tongues 167 and 168 project through the slots in member 155, section 157, and are riveted to the member 155 thereby.

The front end 160 of member 158 is so disposed upon member 155 that when the front edge of member 155 is in alinement with the front face of the beam magazine, said end 160 abuts the rear upright walls of skirts 108 to arrest further inward movement of the follower to prevent contact with the staple driving tool after discharging the last staple into the path of such tool.

The handle member 158 may have flaring finger pieces as shown or these may be otherwise shaped and disposed. Between the finger pieces 164 the end 162 is turned up and rises to a greater height than the front end member 160.

In the rear upturned section 162, there is means such as slot 169 for receiving the loop 170 of the magazine spring 171. The height of the slot 169 for the spring 171 is sufficient to maintain the spring 171 above the top of the front stop member 160 at all times when the follower is upon the magazine.

The spring 171 is of a conventional clock spring structure save that it has a narrow loose center end 172. The spring 171 is coiled about a parallelepiped core 120 which is hollow to receive a section of the spring end and also key 119. The end 172 of the spring 171 is of reduced cross section or tapered to be inserted into opposed slots 173 and 174 in the rectangular core 120, the coiling of the spring 171 about the core 120 being as snown in Figure 1, with a section of the spring end 172 reversed to the direction of the winding of the body of the spring. Such reversing of the end 172 after its insertion provides sufficient anchoring for the spring 171 against unwinding and displacement under normal conditions of use.

At opposed sides of the wings 113 and 114 are rectangular slots 117 and 118 (Figures 2 and 30) to receive a key 119 on which is supported a spring core 120, the key 119 comprising a small end 121 fitting into the slot 118 on one side of the housing, a body 122 (Figures 1 and 21) trapezoidal in cross section which is co-extensive with the distance between the wings 113 and 114 and which receive the spring core 120, and an extension, a part 123 for seating in the slot 117 at one wing of the housing and a head 124 which is enlarged and which provides a means for manipulating the key 119.

When the spring 171 is coiled about the core 120, the core 120 is inserted between the wings 113 and 114 in alinement with the slots. The key 119 is then positioned transversely of the wings through the hollow body of said core. Upon release of the spring from the means used to hold it in registry with the slots mentioned, the spring will instantly assert a torsional force to disaline the core 20 and key 119 and urge upon the core and spring the position illustrated in Figure 1. The core will take a position in respect to the key with the walls of the core parallel to the oblique face of section 122 of the key 119. This position of the parts provides a lock therebetween and with respect to wings 113 and 114 which prevents the spring 171 from being accidentally displaced from between the wings, a position which will be maintained so long as the spring lasts. The key 119 cannot readily be removed because it is difficult to reposition the core of the spring in registry with the slots 117 and 118 with the walls of the core parallel to the straight side of the key 119. If it is desired to remove said key and spring from the housing, the follower may be forced backwardly until the spring has reached a diameter that it may be surrounded by a grip piece 180 later to be described. The grip piece is positioned thereabout and the follower released. The tension of the spring within the grip piece causes tight engagement between the two allowing for ready manipulation to remove the spring.

Some difficulty has been had in stapling machines with broken springs. The type of spring anchor in combination with the key just described provides a ready means for replacing broken springs. Extra springs are provided with or without their outer ends anchored to followers, and with the body of the springs entwined about a core and locked thereon with the narrow end 172 disposed in the slots 173 and 174. Any simple means of attaching the spring to the follower may be adopted where the springs are supplied free from the follower. The spring 171 is coiled to the desired degree in the place of manufacture and in its wound condition is inserted into a grip piece 180 having a body from which truly arcuate legs 181 and 182 extend slightly more than one hundred eighty degrees. For convenience in handling the yoke has a handle 183 at the outside thereof. Because of the length of the legs 181 and 182, the spring 171 will be maintained in its wound condition under all normal circumstances. It may be displaced therefrom in a manner hereinafter described.

When it is desired to insert a new spring in a stapling device, the old spring, spring core, and follower are removed. This is not difficult for when a spring is broken there is no resistance to the proper alinement of the spring core 120, key 119 and slots 117 and 118 so that the key 119 may be readily withdrawn. The new spring held within the yoke 180 is inserted while held in coiled condition by the legs 181 and 182 and the key 119 is inserted into place. The yoke is then pulled rearwardly of the stapling device. A slight pull on the staple follower will reduce the diameter of the spring and cause the retainer 180 to drop away from the spring. Instantly the core 120 disalines itself with the key 119 to lock the spring core 120 and key 119 in position between the wings. The follower 155 if not previously disposed in the staple magazine may now be inserted therein for use.

Staples are loaded into the device in the usual manner. The initial step is to withdraw the follower 155 and allow it to rest against the housing under the tension of spring 171. As many staples as may be conveniently placed in the magazine are inserted thereinto while leaving room enough for the follower 155. The follower is then replaced and the staples will be urged to move along the magazine staple track, the foremost staple alining itself with the staple driving tool 139 against the front 106 of the housing.

Because of the urge of spring 99, the beam magazine will be in a position away from the base 20 at the front of the device and the staple driving member 130 will be at its topmost position because of the urge of spring 151. In such position the device is ready for a down stroke to drive a staple through any material which may be positioned upon the anvils 21, the relation of which is adjusted to provide the particular type of clinch that is desired.

Pressure or a blow on the handle 141 will move the housing and magazine against the material to be stapled, the continuation of such pressure or blow dislodging the staple driving tool from its normal position in the housing downwardly therein to first cause the tool 139 to engage a staple in the path and to thereafter advance such staple out of the housing with its legs striking the axis of the two anvil dies, to be deformed in the particular manner dependent upon the shape of the recess in the anvils and the angular position of such recesses relatively to one another.

The material through which such a staple is driven will then be held together in the particular manner determined by the user and in one of the manners shown in Figures 5 to 10, inclusive, or in some modification thereof.

On release of the hand from the handle 141, the staple driver and the beam and housing thereon rise concurrently to their uppermost positions, that of the beam being regulated by the position of the riser 66 or 67 to the several steps 54, 55 or 56, or the underside of the base 20. The head will rise to its uppermost position under the urge of spring 151.

The machine is then ready for further use with cycles of operation in the manner just described.

In Figures 1, 32 and 33 is shown a construction embodied in the core and beam illustrated in Figure 17 adapted to prevent clogging of the apparatus. The forward end of the inverted channel member 79 is slotted as illustrated at 101a. Slots 101c are also provided at intervals and on opposite sides of this member and extend a sufficient amount into the top portion thereof to provide openings from the upper side extending into the interior. The slots at the forward or rejection chute end, while providing openings similar to slots 101c, also provide a horizontal surface 101a and an oblique surface 101b, the latter defining with the front edge of member 79 a cutting edge.

Any foreign matter entering the magazine can readily fall out through the openings provided by the slots 101c. In the event the legs of a staple are slightly deformed they will, upon the staple being driven out through the ejection chute, be straightened by the oblique surface 101b. If such legs are badly deformed they will be forced rearwardly along the surface 101a. Upon being severed from the bridge of the staple by the action of the driving tool and the aforementioned cutting edge, the legs will fall from the surface 101a into the interior of the member 79 and hence out of the magazine. The bridge portion will be ejected out through the ejection chute.

What is claimed as new and is desired to be secured by Letters Patent of the United States is:

1. A staple driving plunger triangular in cross section, a housing thereabout and having walls, and means for moving said walls relatively to said driving member.

2. A staple driving head comprising a housing having walls, means for adjusting said walls relatively to one another, and a staple driving plunger in said housing, said staple driving plunger engaging said wall adjustment means to limit the movement of said plunger in said housing.

3. In a staple driving device, a housing, a staple driving plunger reciprocable in said housing, a magazine to which said housing is anchored, a spring in said staple driving plunger, and a guide member for said spring comprising a flat strip of material disposed transversely of said magazine and projecting vertically from said magazine, said spring being supported at its bottom by said guide member and extending upwardly therefrom.

4. In a staple driving device, a housing, a beam magazine extending thereinto, a staple follower on said beam magazine, a spring in said housing for actuating said follower, and a handle member for said follower, said handle member having upturned ends, one of said upturned ends providing an abutment for engaging said housing to provide a stop for said follower and the other upturned end providing an anchor for said spring, said spring being secured to said anchor.

5. In combination, a stapling device comprising a housing, a magazine follower spring in said housing, a beam magazine on which said housing is secured, a follower in said magazine, a handle member for said follower, sections of said member providing laterally disposed finger pieces, other sections of said member being upturned, one to provide a stop for said follower, and the other an anchor for a magazine follower spring.

6. In combination, a stapling device comprising a housing, a beam magazine on which said housing is secured, a follower in said magazine, a spring anchored to said follower, a hollow rectangular core for said spring, and a key in said housing and extending through said core to secure said spring in said housing.

7. In combination, a stapling device comprising a magazine and a housing, a key extending across said housing, a spring, a parallelepiped hollow core about which said spring is coiled, and a magazine follower attached to said spring, said key being trapezoidal in cross section, said spring being inserted across the hollow portion of said core and being wound to produce a tension displacing said core relatively to said key when disposed in said housing.

8. In a staple driving device, a base, a beam, a member depending through said base, and means secured to said base and movable transversely of the path of movement of said member for determining the relative angular position of said beam and base.

9. In a stapling machine, a base, a beam, means for pivoting said beam to said base, a member on said pivoting means and extending through said base, a second member pivoted to said base and movable transversely thereof in the plane of said base and into the path of said first member, steps on said second and transversely movable member cooperating with said first member for determining the angular separation of said beam from said base, and means for locking said laterally movable second member in selected positions.

10. In a stapling device, a housing, a triangular plunger in said housing, a staple driving member on one of the sides of said plunger, and means for adjusting the fit between said plunger and housing.

11. In a stapling device, a magazine for staples comprising an inverted U-shaped member, a core upon which staples ride imposed upon said member, and guide plates associated with said member and spaced from said core to guide staples thereon, staple guiding means at one end of said magazine and forming therewith an ejection chute through which staples are driven from said magazine, said member being provided along the length thereof with spaced slots providing openings from said magazine into the interior of said member.

12. In a stapling device, a magazine for staples comprising an inverted U-shaped member, a core upon which staples ride imposed upon said member, and guide plates associated with said member and spaced from said core to guide staples thereon, staple guiding means at one end of said magazine and forming therewith an ejection chute through which staples are driven from said magazine, said member at the ejection chute end thereof being slotted to provide horizontal and oblique surfaces, said surfaces being related to said magazine and ejection chute to guide slightly bent legs of staples into said chute and to cooperate in severing badly bent legs from the bridge and to permit discharge thereof after severing.

13. A beam magazine for a stapling device comprising a core of laminated material, a riser for regulating angular movement of the beam and inserted between the laminations of such material, and a member enclosing sections of said core to provide a staple path therealong.

14. A beam magazine for a stapling device comprising a core of laminated material, a riser for regulating angular movement of the beam and inserted between the laminations of such material, a member enclosing sections of said core to provide a staple path therealong, and fastening means for securing the laminated material, riser and said enclosing member in assembly.

15. In a stapling device, a magazine for staples, a housing associated with said magazine and having walls, said housing and said magazine defining an ejection chute for staples, a driving tool reciprocable in said housing and chute, said tool being guided by a wall of said housing, and a member secured to said wall and engaging said tool to maintain the same in slidable contact with said wall.

16. In a stapling device, a magazine for staples comprising a channel member, a core within said member and spaced from the sides thereof, and a housing associated with said magazine and forming therewith an ejection chute through which staples are driven from said magazine, said member having ears projecting therebelow, said housing being secured to said ears.

17. In a stapling machine, a magazine, staple driving mechanism including a reciprocal plunger, a housing for said mechanism, said plunger being reciprocable in said housing, said housing comprising a plurality of flat enclosing walls, the inner surfaces of which provide guiding means for said plunger, one of said walls having its edge spaced from the edge of an adjacent wall, and adjustable take-up means associated with said spaced edges operable to relatively adjust said walls to provide an adequate guide support for said plunger.

18. In a stapling machine, a magazine, staple driving mechanism including a reciprocal plunger, means for feeding staples from said magazine to said mechanism including a coiled spring, a housing for said mechanism and said spring, said plunger being reciprocable in said housing, said housing comprising a plurality of flat enclosing walls, the inner surfaces of which provide guiding means for said plunger, one of said walls having its edge spaced from the edge of an adjacent wall, said edges being provided with projecting wings, said wings being spaced and formed to provide a housing for said spring, and adjustable take-up means extending between said wings and operable to relatively adjust said walls to provide adequate guide support for said plunger.

19. In a stapling machine, a beam magazine, staple driving mechanism associated with said magazine and including a reciprocal plunger, means for feeding staples from said magazine to said mechanism including a coiled spring, and a housing for said mechanism and said spring, said housing having lower skirts secured to said magazine, said skirts having an upper portion providing an abutment for said staple feeding means, said housing having oblique walls for guiding said plunger, said oblique walls being provided with projecting wings spaced to form a support for said spring.

20. In a stapling machine, a beam magazine, staple driving mechanism associated with said magazine and including a reciprocal plunger, means for feeding staples from said magazine to said mechanism including a coiled spring, and a housing for said mechanism and said spring, said housing being provided with spaced lower and upper rearwardly extending sections, said lower section comprising spaced skirts secured to said magazine, and said upper section comprising spaced wings between which said spring is supported.

21. In a stapling machine, a base, a magazine beam, a pivot for movably mounting said beam on said base, a riser member movably mounted on said pivot and adapted to normally maintain said beam in a predetermined position, and a spring associated with said member to urge the same in a direction adapted to move said beam away from said base, said member having a portion engageable with said base to limit its motion in said direction.

22. In a stapling machine, a magazine, a housing positioned on said magazine, a staple driving plunger reciprocable in said housing, a spring for said plunger, a guide member for said spring, said guide member having a lower cross arm provided with tongues, said magazine having opposed notches within which said tongues are positioned to support said member, said member having a stem fitting within said spring to guide the same.

WILLIAM G. PANKONIN.

CERTIFICATE OF CORRECTION.

Patent No. 2,087,779.  July 20, 1937.

WILLIAM G. PANKONIN.

It is hereby certified that error appears in the printed specification of the above numbered patent requiring correction as follows: Page 1, second column, line 11, for the word "plunger" read tool and for "member" read plunger; and that the said Letters Patent should be read with these corrections therein that the same may conform to the record of the case in the Patent Office.

Signed and sealed this 31st day of August, A. D. 1937.

Leslie Frazer (Seal)  Acting Commissioner of Patents.